(12) United States Patent
Newman

(10) Patent No.: US 12,131,010 B2
(45) Date of Patent: *Oct. 29, 2024

(54) APPARATUS, METHOD, AND COMPUTER-READABLE STORAGE MEDIUM FOR MANIPULATING A USER INTERFACE ELEMENT

(71) Applicant: Newman Infinite, Inc., Irvine, CA (US)

(72) Inventor: Matthew Allan Newman, Los Angeles, CA (US)

(73) Assignee: Newman Infinite, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,313

(22) Filed: Jan. 17, 2022

(65) Prior Publication Data

US 2022/0137760 A1     May 5, 2022

Related U.S. Application Data

(63) Continuation of application No. 14/344,865, filed as application No. PCT/US2012/055249 on Sep. 13, 2012.

(60) Provisional application No. 61/534,005, filed on Sep. 13, 2011.

(51) Int. Cl.
| | | |
|---|---|---|
| G06F 3/0484 | (2022.01) | |
| G06F 3/04842 | (2022.01) | |
| G06F 3/04845 | (2022.01) | |
| G06F 3/0488 | (2022.01) | |
| G06F 3/04886 | (2022.01) | |

(52) U.S. Cl.
CPC ........ *G06F 3/0484* (2013.01); *G06F 3/04842* (2013.01); *G06F 3/04845* (2013.01); *G06F 3/0488* (2013.01); *G06F 3/04886* (2013.01)

(58) Field of Classification Search
None
See application file for complete search history.

(56) References Cited

U.S. PATENT DOCUMENTS

| | | |
|---|---|---|
| 8,448,083 B1 | 5/2013 | Migos et al. |
| 2006/0026535 A1* | 2/2006 | Hotelling .............. G06F 3/0488 715/863 |
| 2007/0254722 A1 | 11/2007 | Kim et al. |
| 2007/0260727 A1 | 11/2007 | Kutaragi |

(Continued)

*Primary Examiner* — Yi Wang
(74) *Attorney, Agent, or Firm* — Sean Casey

(57) ABSTRACT

Disclosed herein are clutch and boom features that can enable the manipulation of user interface elements when using a touch-sensitive component to build or otherwise design a graphical display, such as a website, video game, magazine layout, etc. Upon touching user interface element to be manipulated, the user interface element can be targeted for manipulation. In response to a clutch user interface element being engaged, the targeted user interface element can be enabled for manipulation (e.g., colored, rotated, moved, etc.) by the user, while the non-targeted user elements are protected from manipulation. Boom is an example of manipulation functionality provided by some embodiments, which can be configured to move the targeted user interface element a precise amount (e.g., pixel-by-pixel).

24 Claims, 12 Drawing Sheets

(56) References Cited

U.S. PATENT DOCUMENTS

| | | | |
|---|---|---|---|
| 2008/0036743 A1* | 2/2008 | Westerman | G06F 3/038 |
| | | | 345/173 |
| 2010/0231539 A1 | 9/2010 | Cruz-Hernandez et al. | |
| 2010/0283746 A1 | 11/2010 | Vuong et al. | |
| 2010/0295797 A1* | 11/2010 | Nicholson | G06N 7/005 |
| | | | 345/173 |
| 2011/0185321 A1* | 7/2011 | Capela | G06F 3/0488 |
| | | | 345/173 |
| 2012/0127642 A1 | 5/2012 | Rolus Borgward | |
| 2013/0063362 A1* | 3/2013 | Papakipos | G06F 1/1626 |
| | | | 345/173 |
| 2013/0069991 A1* | 3/2013 | Davidson | G06F 3/04886 |
| | | | 345/663 |
| 2013/0093690 A1* | 4/2013 | Papakipos | G06F 3/0488 |
| | | | 345/173 |

\* cited by examiner

APPARATUS, METHOD, AND COMPUTER-READABLE STORAGE MEDIUM FOR MANIPULATING A USER INTERFACE ELEMENT

CROSS-REFERENCE TO RELATED APPLICATIONS

This application claims the benefit of and priority to U.S. Provisional Patent Application No. 61/534,005, filed Sep. 13, 2011, PCT Patent Application No. PCT/US2012/055249 filed Sep. 13, 2012, and U.S. patent application Ser. No. 14/344,865 filed Mar. 13, 2014, now U.S. Pat. No. 11,262,892 granted Mar. 1, 2022.

FIELD

Embodiments of the invention relate, generally, to graphical design of user interfaces.

BACKGROUND

Software applications, such as website design applications, video game design programs, presentation/drawing software and smartphone application building tools, are evolving such that graphical objects can be created, moved, sized, shaped, colored and/or otherwise manipulated using a mouse. It follows that the actual writing of code to develop software is becoming less prevalent, because software can now be compiled automatically based upon a graphical layout that is created.

The increase in graphical software creation seems to be correlated to the increase in popularity of multi-touch devices, such as tablets and smart phones. However, the ability to write software using these visual tools noted above is often limited by the lack of precision of multi-touch devices (as compared to a mouse or other pointer) and obscuring of the display that occurs when a user touches the display. Hence, graphical software creation is often more difficult to do and does not always easily transfer to multi-touch devices, and is usually reserved for traditional computing devices (e.g., having a mouse and keyboard), whereas multi-touch devices are generally used for consumption purposes (e.g., surfing the web and reading media). Through applied effort, ingenuity, and innovation, many problems have been identified and solved by developing solutions that are included in embodiments of the present invention, many examples of which are described in detail herein.

BRIEF SUMMARY

Provided herein, according to some exemplary embodiments, are apparatuses, methods, computer program products and any other type of systems comprising means for manipulating user interface elements presented on a display screen. A touch-sensitive display screen can be provided that is configured to: display a target user interface element (e.g., a user interface element to be selected for manipulation); display a clutch user interface element (e.g., a user interface element that engages the target user interface element for manipulation); detect a selection touch event (e.g., a user touching the display in proximity to the target user interface element); and detect an engaging touch event (e.g., detects a user touching the display in proximity to the clutch user interface element).

Also included in some embodiments is a processor configured to: determine the selection touch event has occurred in proximity to the target user interface element while there is an absence of an engaging touch event in proximity to the clutch user interface element; select the target user interface element for manipulation in response to determining the selection touch event has occurred; determine when the engaging touch event is occurring; and when the engaging touch event is occurring, activate manipulating functionality associated with the target user interface element.

The processor can be further configured to: determine when the engaging touch event ceases to occur; and deactivate the manipulating functionality associated with the target user interface. Additionally or alternatively, the processor can be further configured to activate selection functionality that enables a user interface element to be selected while there is an absence of the engaging touch event. In some embodiments, the selection functionality can be active even when the engaging touch event is detected.

A non-transitory storage medium and/or other type of memory can also be included and be configured to store a target element identifier associated with the target element in response to determining the selection touch event has occurred. The target element identifier may be unique to the target element. The target element identifier may be generated randomly, assigned when each user interface element is created, and/or generated in any other suitable fashion.

In response to determining an engaging touch event has begun occurring, a processor in accordance with some embodiments can be configured to: retrieve the target element identifier from memory; and associate the target user interface element with the manipulating functionality. In some embodiments, in response to determining the target user interface element has been selected for manipulation, the processor is further configured to cause the display of a visual indicator identifying the target user interface as selected.

The processor can also or instead be configured to enable a user to manipulate the target user interface element in a manner that is permitted only when the engaging touch event is being detected. As another example, the processor can be further configured to enable a user to manipulate the target user interface element in a manner that is restricted unless the engaging touch event is detected.

The processor is further configured to enable boom functionality, which can enable a user of a multi-touch device to move a user interface element with precision (e.g., pixel-by-pixel). One or more overlays having various tabs to other menus can also be included. In addition to having one or more selectable virtual buttons associated with one or more manipulating functionalities that are activated while the engaging touch event is occurring, the overlays and/or other types of menus can also show information representative of the user interface being built, such as the location (in pixel x-y-z coordinates) of a targeted or other user interface element and/or cursor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein. For example, references may be made herein to directions and orientations including up, down, right and left; it should be understood, however, that any direction and orientation references are simply examples and that any particular direction or orientation may depend on the particular object, and/or the orientation of the particular object, with which the direction or orientation reference is made. Like numbers refer to like elements throughout.

Graphical design applications, such as those used for websites, video games and other graphical interfaces, are become more prevalent. As a result, it is easier for many application developers build graphical interfaces by using such graphical design applications, as opposed to, for example, writing software code.

Figure 1:
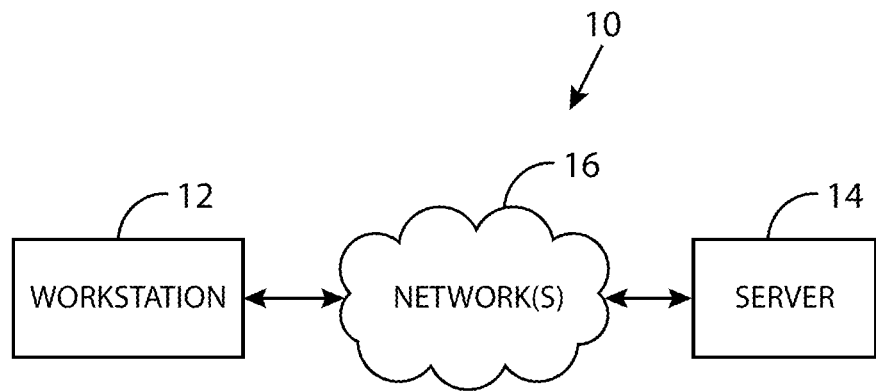
FIG. 1 illustrates a schematic block diagram of a system configured to operate in accordance with some example embodiments of the present invention.

Tablet computers and other touch devices are also becoming more prevalent. However, it can be relatively difficult to design and build graphical interfaces using touch devices (as compared to traditional computing devices) due to the intrinsic characteristics associated with touch devices (e.g., having to touch the display you are trying to build and only select discrete items as opposed to make broad sweeping gestures). In solving some of these problems, FIG. 1 illustrates a system 10 that may benefit from exemplary embodiments of the present invention ("example," "exemplary" and like terms as used herein refer to "serving as an example, instance or illustration"). As shown, the system includes one or more clients, such as workstation 12, and may further include one or more servers, such as server 14. Generally, the workstation 12 and server 14 of exemplary embodiments may comprise (e.g., include and/or be embodied in) one or more portable or fixed electronic devices, such as one or more of a portable media player, smartphone, portable digital assistant (PDA), tablet computer, laptop computer, desktop computer, server computer or the like. In this regard, while tablet computers having a multi-touch display are referenced herein in disclosing some examples of embodiments of the invention, some embodiments discussed herein may likewise be implemented by other types of apparatuses without departing from the spirit of the invention.

The workstation 12 and server 14 may be configured to directly and/or indirectly communicate with one another in any of a number of different manners including, for example, any of a number of wireline or wireless communication or networking techniques. Examples of such techniques include, without limitation, Universal Serial Bus (USB), radio frequency (RF), Bluetooth (BT), infrared (IrDA), any of a number of different cellular (wireless) communication techniques such as any of a number of 2G, 2.5G, 3G or 4G communication techniques, local area network (LAN), wireless LAN (WLAN) techniques, and/or any other suitable technique(s). In accordance with various ones of these techniques, the client(s) and server may be coupled to and configured to communicate across one or more networks 16. The network(s) 16 may include any of a number of different combinations of one or more different types of networks, including data and/or voice networks. For example, the network(s) 16 may include one or more data networks, such as a LAN, a metropolitan area network (MAN), and/or a wide area network (WAN) (e.g., Internet), and include one or more voice networks, such as a public-switched telephone network (PSTN). Although not shown, the network(s) 16 may include one or more apparatuses such as one or more routers, switches or the like for relaying data, information or the like between the workstation 12 and server 14.

Figure 2:
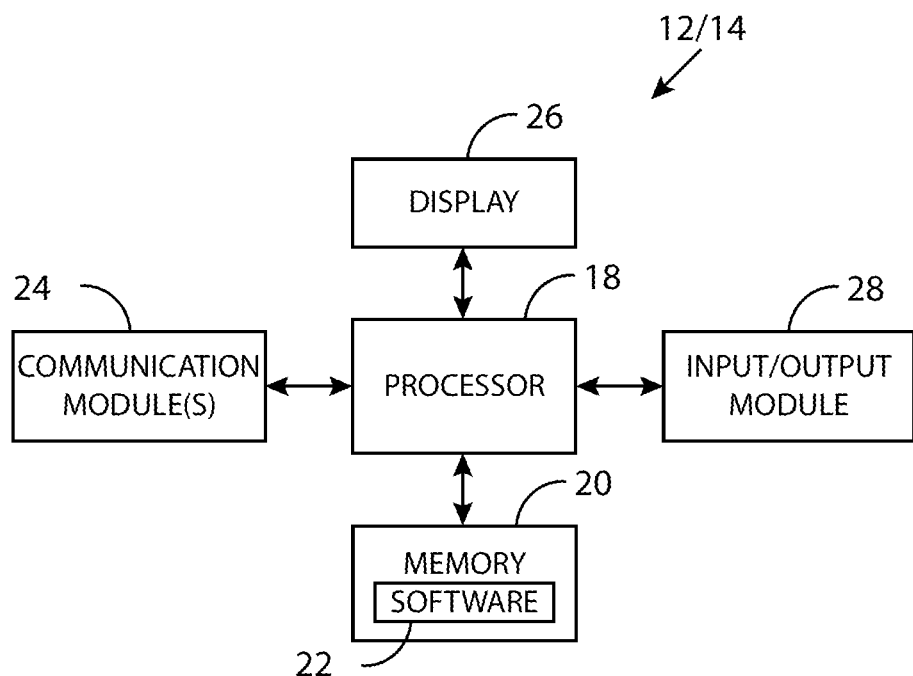
FIG. 2 illustrates a schematic block diagram of an apparatus configured to operate in a client and/or server in accordance with some example embodiments of the present invention.

Reference is now made to FIG. 2, which illustrates a block diagram of circuitry, some or all of which may be included in an apparatus that may be configured to operate as or otherwise perform one or more functions of a workstation 12 and/or server 14. Although shown in FIG. 1 as separate apparatuses, in some embodiments, the apparatus may support functionality associated with either or both workstation 12 and/or server 14, logically separated but co-located within the same housing. The apparatus of exemplary embodiments of the present invention includes various means for performing one or more functions in accordance with exemplary embodiments of the present invention, including those more particularly shown and described herein. It should be understood, however, that either or both of the apparatuses may include alternative means for performing one or more like functions, without departing from the spirit and scope of the present invention.

As shown in FIG. 2, the apparatus may include a processor 18 connected to a memory 20. In accordance with some example embodiments, the circuitry can includes various means, such as processor 18, memory 20, communications module 24, and/or input/output module 28. In some embodiments, such as when the circuitry is included in tablet and/or other device using a touch-sensitive interface component. As referred to herein, "module" includes hardware, software and/or firmware configured to perform one or more particular functions. In this regard, the means of circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 20) that is executable by a suitably configured processing device (e.g., processor 18), or some combination thereof.

Processor 18 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 18 comprises a plurality of processors. The plurality of processors may be embodied on a single computing device or may be distributed across a plurality of computing devices collectively configured to function as circuitry. The plurality of processors may be in operative communication with each other and may be collectively configured to perform one or more functionalities of the circuitry as described herein. In an example embodiment, processor 18 is configured to execute instructions stored in memory 20 or otherwise accessible to processor 18. These instructions, when executed by processor 18, may cause the circuitry to perform one or more of the functionalities of the circuitry as described herein.

Whether configured by hardware, firmware/software methods, or by a combination thereof, processor 18 may comprise an entity capable of performing operations according to embodiments of the present invention while configured accordingly. Thus, for example, when processor 18 is embodied as an ASIC, FPGA or the like, processor 18 may comprise specifically configured hardware for conducting one or more operations described herein. Alternatively, as another example, when processor 18 is embodied as an executor of instructions, such as may be stored in memory 20, the instructions may specifically configure processor 18 to perform one or more algorithms and operations described herein, such as those discussed in connection with FIGS. 3 and 4.

Memory 20 may comprise, for example, volatile memory, non-volatile memory, or some combination thereof. Although illustrated in FIG. 2 as a single memory, memory 20 may comprise a plurality of memory components. The plurality of memory components may be embodied on a single computing device or distributed across a plurality of computing devices. In various embodiments, memory 20 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 20 may be configured to store information, data, applications, instructions, or the like for enabling the circuitry to carry out various functions in accordance with example embodiments of the present invention. For example, in at least some embodiments, memory 20 is configured to buffer input data for processing by processor 18. Additionally or alternatively, in at least some embodiments, memory 20 is configured to store program instructions for execution by processor 18. Memory 20 may store information in the form of static and/or dynamic information. This stored information may be stored and/or used by the circuitry during the course of performing its functionalities.

Communications module 24 may be embodied as any device or means embodied in circuitry, hardware, a computer program product comprising computer readable program instructions stored on a computer readable medium (e.g., memory 20) and executed by a processing device (e.g., processor 18), or a combination thereof that is configured to receive and/or transmit data from/to another device's circuitry. In some embodiments, communications module 24 (like other components discussed herein) can be at least partially embodied as or otherwise controlled by processor 18. In this regard, communications module 24 may be in communication with processor 18, such as via a bus. Communications module 24 may include, for example, an antenna, a transmitter, a receiver, a transceiver, network interface card and/or supporting hardware and/or firmware/software for enabling communications with another computing device. Communications module 24 may be configured to receive and/or transmit any data that may be stored by memory 20 using any protocol that may be used for communications between computing devices. As such, some or all of memory 20 may be located remotely from processor 18, such as on a network drive, thereby enabling cloud-based functionality. Communications module 24 may additionally or alternatively be in communication with the memory 20, input/output module 28 and/or any other component of the circuitry, such as via a bus.

Input/output module 28 may be in communication with processor 18 to receive an indication of a user input and/or to provide an audible, visual, mechanical, or other output to a user. Some example visual outputs that may be provided to a user by the circuitry are discussed in connection with FIGS. 5-7 and 11-13. As such, input/output module 28 may include support, for example, for a keyboard, a mouse, a joystick, touch sensitive components, a microphone, a speaker, a RFID reader, barcode reader, biometric scanner, and/or other input/output mechanisms. Input/output module 28 may include display 26 and/or be in communication with the memory 20, communications module 24, and/or any other component(s), such as via a bus. Although more than one input/output module and/or other component can be included in the circuitry, only one is shown in FIG. 2 to avoid overcomplicating the drawing (like the other components discussed herein).

As noted above, memory 20 may store instructions in the form of one or more software applications, such as software 22, modules, etc. that configures processor 18 to perform steps associated with operation of the apparatus in accordance with embodiments of the present invention. Two examples of such functionality are provided herein and are related to manipulating one or more user interface elements and, without limitation, are referred to herein as "Clutch" and "Boom." For example, software 22 may cause processor 18 to be configured to function as special-purpose machine providing the specialized functionality of clutch module 18A and boom module 18B, among others, discussed below. In some embodiments and unlike other functionality of apparatuses discussed herein, clutch module 18A and/or boom module 18B can be configured to be agnostic to all operating systems, with universal application compatibility. Examples of other software applications and/or functionality that may be included are one or more web browsers, productivity applications, gaming applications, utilities or the like are discussed below.

The memory 20 may also store content transmitted from, and/or received by, the apparatus. As described herein, the software application(s) may each comprise software operated by the apparatus. It should be understood, however, that any one or more of the software applications described herein may alternatively be implemented by firmware, hardware or any combination of software, firmware and/or hardware, without departing from the spirit and scope of the present invention.

In addition to the memory 20, the processor 18 may also be connected to at least one interface or other means for displaying, transmitting and/or receiving data, content or the like, such as in accordance with USB, RF, BT, IrDA, WLAN, LAN, MAN, WAN (e.g., Internet), PSTN techniques or the like. In this regard, the interface(s) may include at least one communication interface 24 or other means for transmitting and/or receiving data, content or the like. In addition to the communication interface(s), the interface(s) may also include at least one user interface that may include one or more earphones and/or speakers, a display 26, and/or a user input interface 28. The user input interface, in turn, may include any of a number of components and/or devices allowing the apparatus to receive data from a user, such as a microphone, a keypad, a touch-sensitive surface (integral or separate from the display), a joystick, or other input device. In some embodiments, clutch module 18A and/or boom module 18B can be optimized and/or otherwise configured to enable more efficient and precise user interactions with and/or control over graphical objects via a multi-touch input interface.

Figure 3:
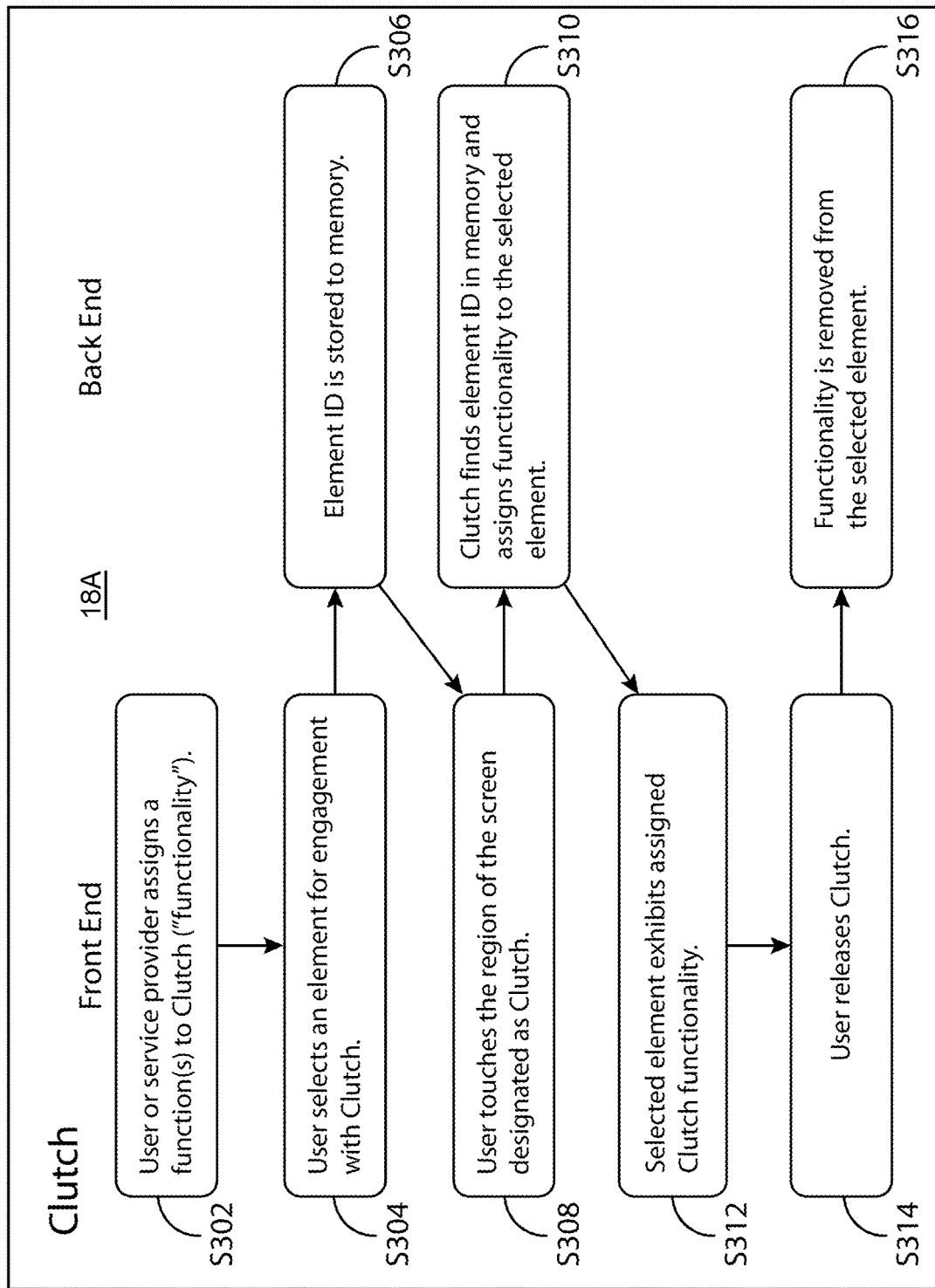
FIGS. 3 and 4 illustrate flowcharts illustrating various steps in methods according to some example embodiments of the present invention.
Figure 4:
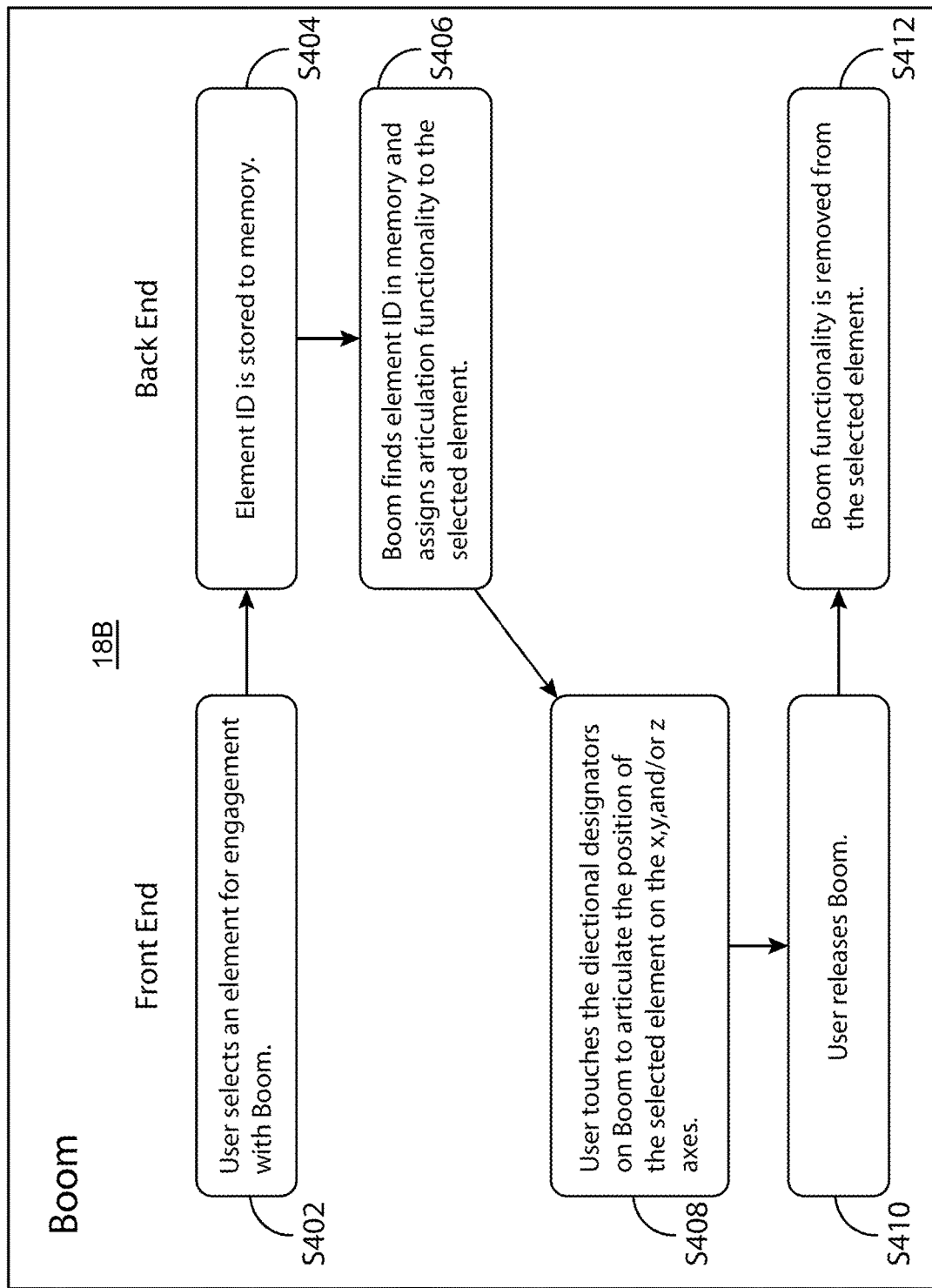

As indicated above, the apparatus may store software applications for execution by the processor 18 to function as a special purpose computer and perform specialized steps associated with operation of the apparatus in accordance with embodiments of the present invention, and two examples of such specialized functionality, namely Clutch and Boom, are provided for causing processor 18 to be configured as a special purpose machine that creates one or more user interface elements. FIGS. 3 and 4 are flowcharts illustrating front-end (e.g., user interface interactions) and back-end (e.g., apparatus) operations of clutch module 18A and boom 18B in accordance with example embodiments of the present invention. FIGS. 5-11 are example displays that may be presented by the apparatus implementing clutch module 18A and boom module 18B, including presentation of user interface elements for each. As shown and described herein, the user interface element(s) presented during operation of clutch module 18A may be referred to as the Clutch user interface (UI) element, Clutch element or simply as Clutch. Similarly, the user interface element(s) presented during operation of boom module 18B may be referred to as the Boom user interface (UI) element, Boom element or simply as Boom.

Figure 5:
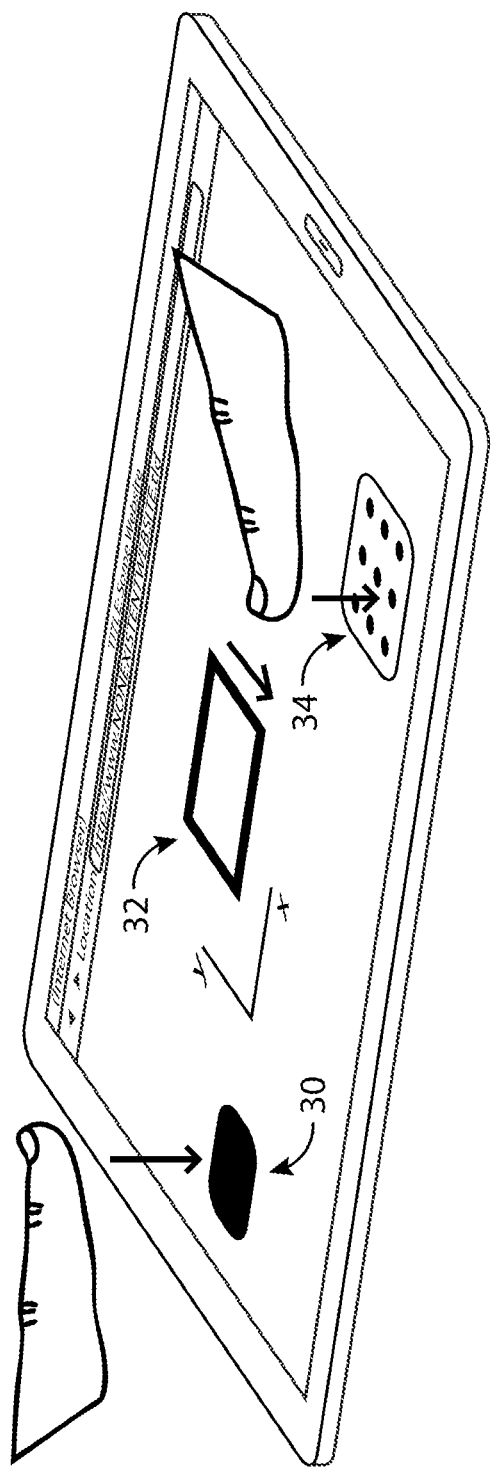
FIGS. 5-7 illustrate example displays that may be presented by the apparatus according to some example embodiments of the present invention.

As shown, Clutch is a proprietary mechanism for engaging and disengaging program functionalities within another software application (e.g., web browser) of a computing environment, and may be particularly useful in a touch interface environment. For example, in some embodiments Clutch can configure the apparatus to provide a mechanism for engaging and disengaging program functionalities within the browser and/or other application of a touch interface environment. By functioning within an application (application program) rather than the operating system, Clutch may be agnostic to all operating systems, with universal application compatibility. With reference to FIGS. 3 and 5, by engaging Clutch via an appropriate clutch UI element 30, the user is able to employ, control and manipulate multiple functionalities within an application, with the function(s) being assigned to the Clutch by the user (and/or any other appropriate service provider) at step S302.

Figure 6:
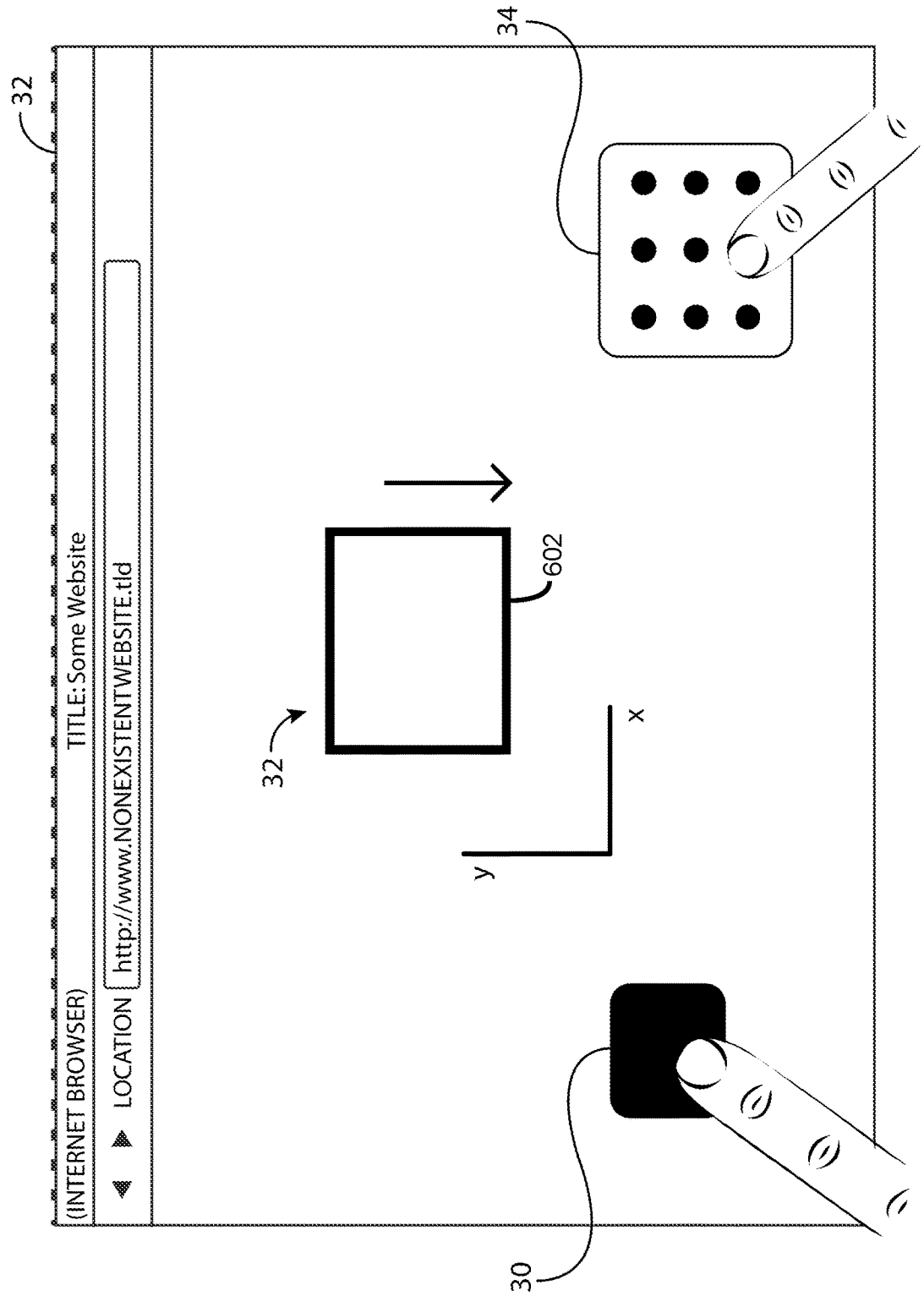
Figure 7:
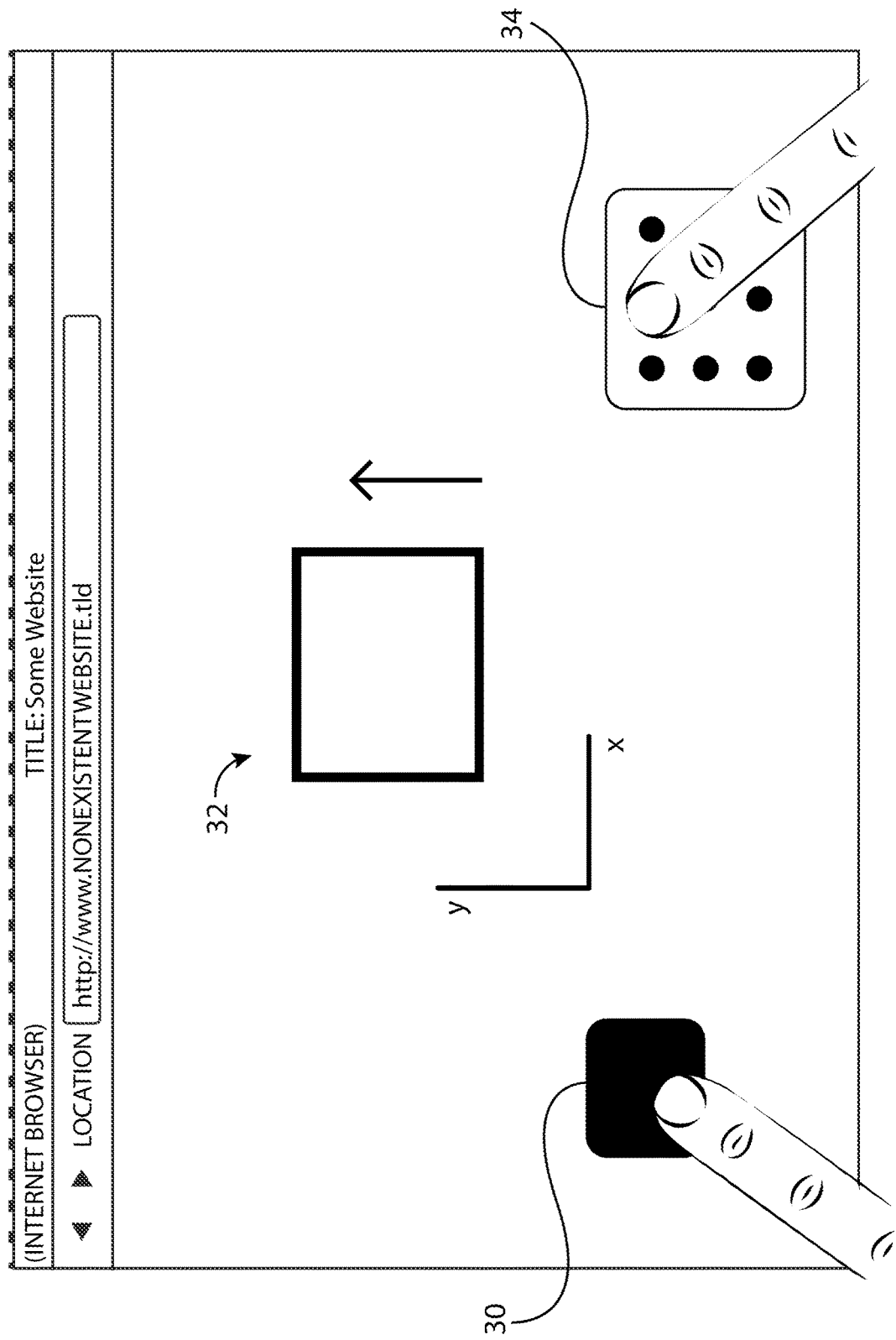
Figure 12:
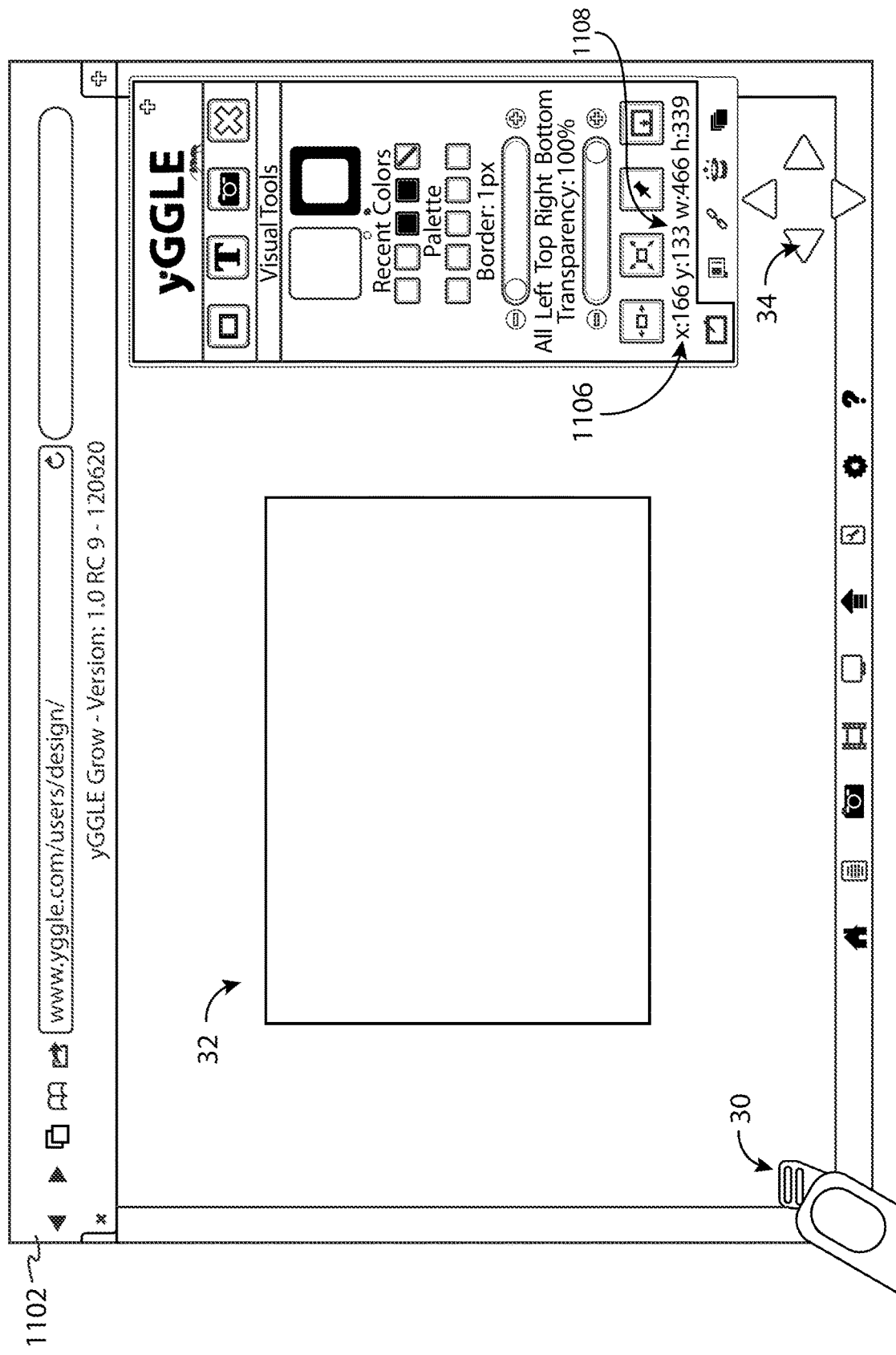
Figure 13:
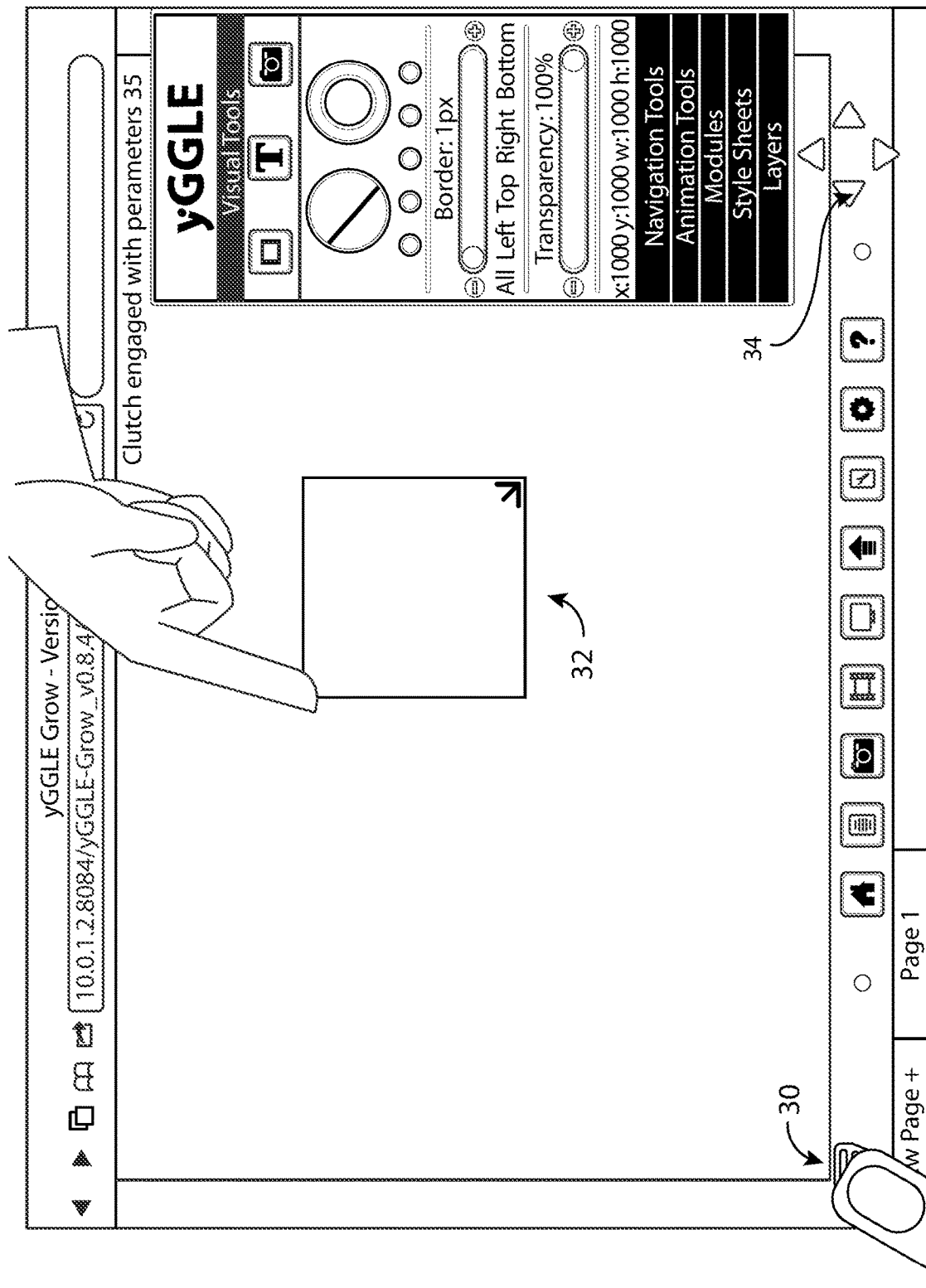

For example, as shown in FIG. 5, a UI element 32 of an application operating on the apparatus may be selected for engagement with Clutch at step S304 with a single tap and/or by the user holding a finger on the display screen in proximity to clutch UI element 30, as shown in FIGS. 6, 7 and 13. UI element 32 may be any type of design element that can be manipulated and/or is displayed by a touch-sensitive display. Although only a single UI element is shown in FIGS. 5-7, 12 and 13, Clutch can allow a user to switch between or otherwise indicate and select (e.g., highlight) different elements of an application for manipulation. Multiple functions (such as those related to, for example, moving, coloring, bolding, grouping, otherwise editing/formatting, etc.) may be employed to manipulate UI element 32 while working in the application with clutch engaged and a user element selected.

An element identifier ("ID") of UI element 32 can be stored to memory at step S306, e.g., in response the apparatus detecting a touch event in proximity to where UI element 32 is being displayed. As referred to herein, a "touch event" being in "proximity" to a UI element includes any suitable touching (by, e.g., a user's finger, stylus, etc.) on the touch-sensitive display, such that the apparatus's operating system and/or other system configuration would cause the apparatus to determine the user has "selected" a virtual button presented by a display screen. In this regard, in response to UI element 32 being selected, a visual indication of UI element 32 being selected may be presented. For example, indicator 602, shown in FIG. 6, can be provided subsequent to the user and/or system selecting UI element 32.

At step S308, the user may touch a region of the screen and/or at least one onscreen button, such as clutch UI element 30, which is designated and/or otherwise associated with the Clutch functionality discussed herein. Clutch module 18A may respond to the system determining clutch UI element 30 has been selected by locating the element ID in memory (e.g., memory 20).

Figure 11:
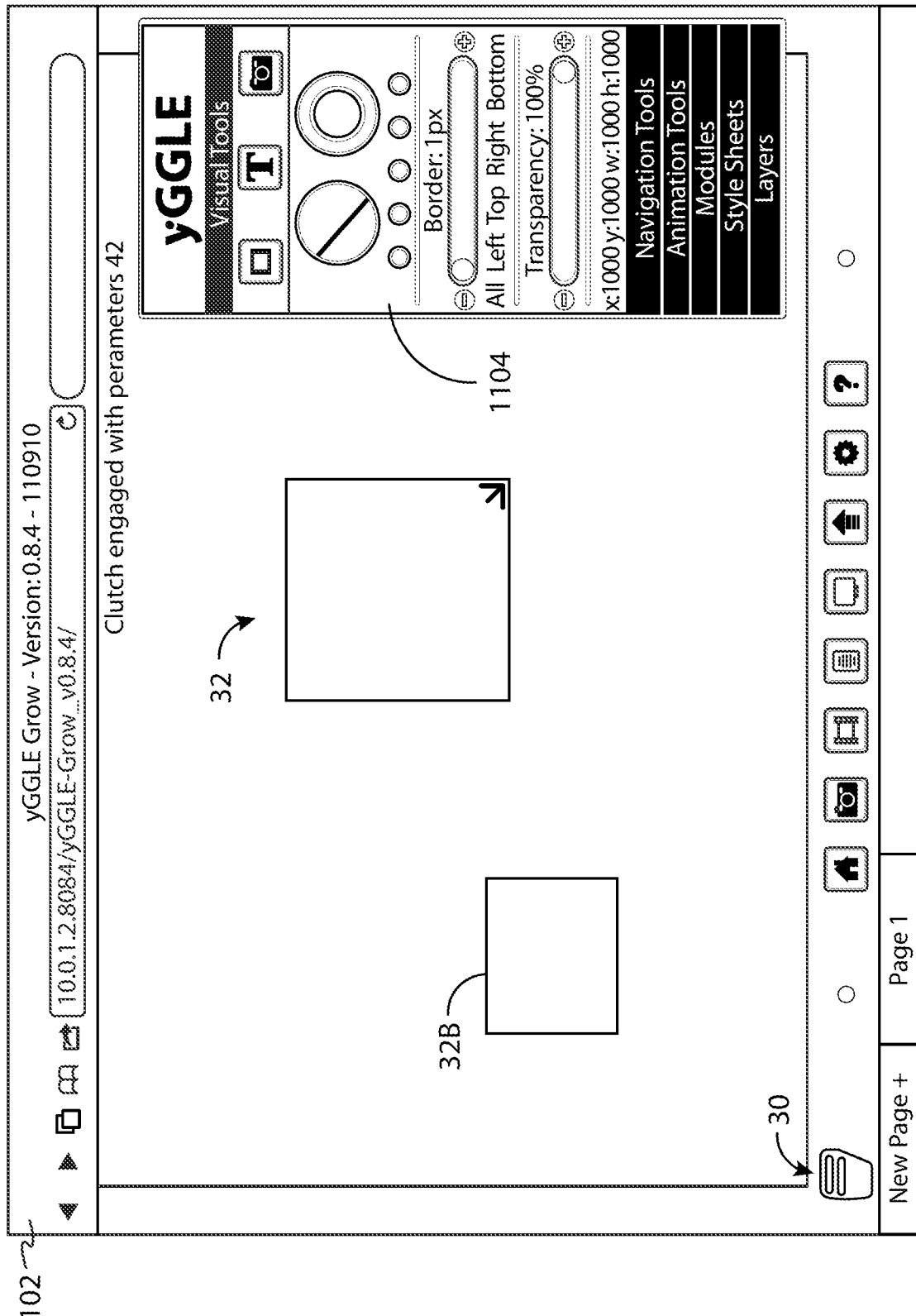
FIGS. 11-13 illustrate example displays that may be presented by the apparatus according to some example embodiments of the present invention.

At S310, functionality can be assigned to the selected UI element 32. For example, movement functionality, coloring functionality, and/or any other manipulative functionality can be assigned to UI element 32 while clutch UI element 30 is selected. In some embodiments, the various manipulative functionality can be associated with one or more menus that may be presented as pallets, ribbons, and/or any other suitable format, some examples of which are shown in FIGS. 11-13. The functionality that is assigned to UI element 32 can be selected by the user (e.g., by touching a manipulative function icon included in a displayed pallet overlay) and/or automatically by the system, and may be determined before or after UI element 32's element ID is stored in memory and/or before/after clutch UI element 30 is selected by the user.

At step S312, the selected UI element 32 may then exhibit the assigned functionality (e.g., change colors, be moveable, be rotatable, etc.). In some embodiments, the manipulative functionality is activated in response to further user interactions. For example, the user may touch clutch UI element 30 while dragging another finger across the screen, thereby causing UI element 32 to move across the screen.

When the user releases clutch (e.g., ceases to touch the portion of the touch screen in proximity with clutch UI element 30), at step S314, the apparatus can be configured to disengage the manipulation functionality associated with UI element 32. As such, should the user drag a finger across the screen, UI element 32 may not move across the screen as it would when clutch UI element 30 is selected. In some embodiments the UI element 32 may not be manipulated in any manner when clutch UI element 30 is disengaged, and in some embodiments UI element 32 may be manipulated in a manner other than how it may be manipulated when clutch UI element 30 is engaged. In this regard, clutch UI element 30 can function as an activation switch for manipulative functionality and/or as a toggle switch between available manipulative functionality.

In some embodiments, the application being operated while clutch is being operated may also influence the manipulative functionality enabled and/or disabled by engaging/disengaging clutch UI element 30. For example, a web browser may have a first set of manipulative functions associated with clutch UI element 30, while a video game or application design application may have a second set of manipulative functions associated with clutch UI element 30.

Returning to the process of FIG. 3, at S316, the assigned functionality can be terminated and removed from the selected UI element 32, thereby causing UI element 30 to be disengaged from manipulation or otherwise have limited manipulative functionality that would have resulted if the apparatus detected touch events (e.g., the user touching various places on the touch-sensitive screen).

By operating within an application rather than the operating system, boom can add supplemental functionality to the apparatus' native operating system and/or other functionality by creating an independent secondary user interface element 34 that may facilitate the precise articulation of application elements within a touch screen environment (e.g., pixel-by-pixel). When operating in a two-dimensional environment, Boom may allow articulation (movement) of an application UI element 32 on the x axis and/or y axis; and when operating in a three-dimensional environment, the boom functionality may further allow articulation of the UI element on the z axis.

In operation, with reference to FIGS. 4 and 5, at step S402, the user may target and touch the screen to select an application UI element, such as UI element 32, for engagement with and manipulation by boom UI element 34. Similar to the discussion above for clutch, an element ID of the UI element 32 is stored to memory at step S404 as the target element identifier.

At step S406, boom UI element 34 may be selected by the user touching and/or applying any other type of touch event in proximity to the display of one or more of the components of boom UI element 34. The processor may then be configured to locate the element ID in memory and assign articulation functionality to the selected UI element 32. The user may engage the boom UI element 34 (e.g., touch directional designators) to articulate the selected UI element 32 on the x, y and/or z axes at step S408.

As shown in FIGS. 6 and 7, clutch UI element 30 may also have to be engaged for the boom functionality to be enabled. When the apparatus detects an engaging touch event at clutch UI 30 and a portion of boom UI element 34 is also in proximity to a second touch event, the selected UI element 32 may move downward and/or upward on the y axes in a manner that correlates with the portion of boom UI element 34 that is selected (as shown in FIGS. 6 and 7, respectively). It should be understood that the selected UI element 32 is not limited to move on the y axes as illustrated by FIGS. 6 and 7, it may also be moved on the x and/or z axes.

Figure 8:
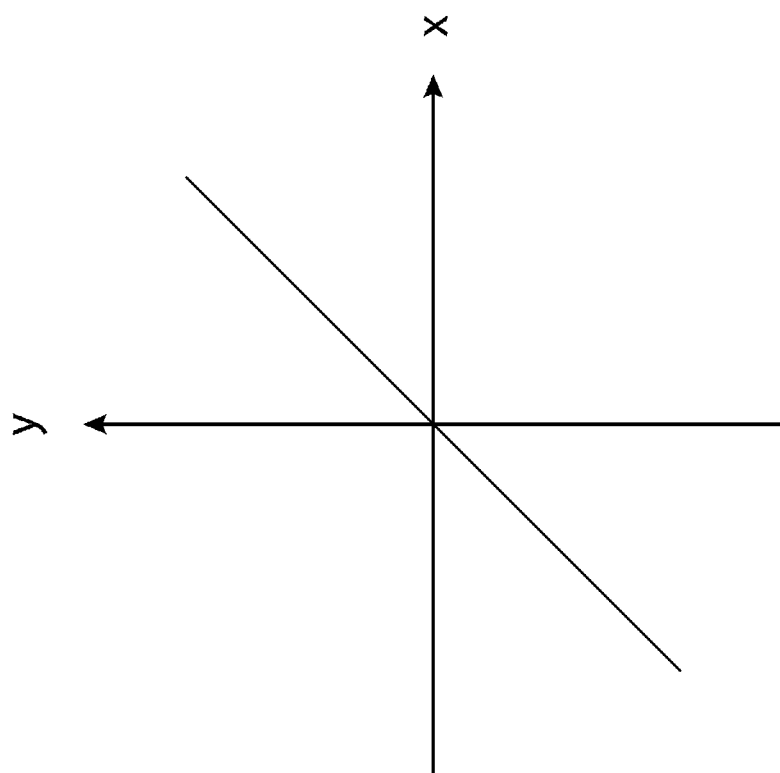
FIG. 8 illustrates an exemplary linear function representative of how a targeted display element may move on a display screen according to some example embodiments of the present invention.
Figure 9:
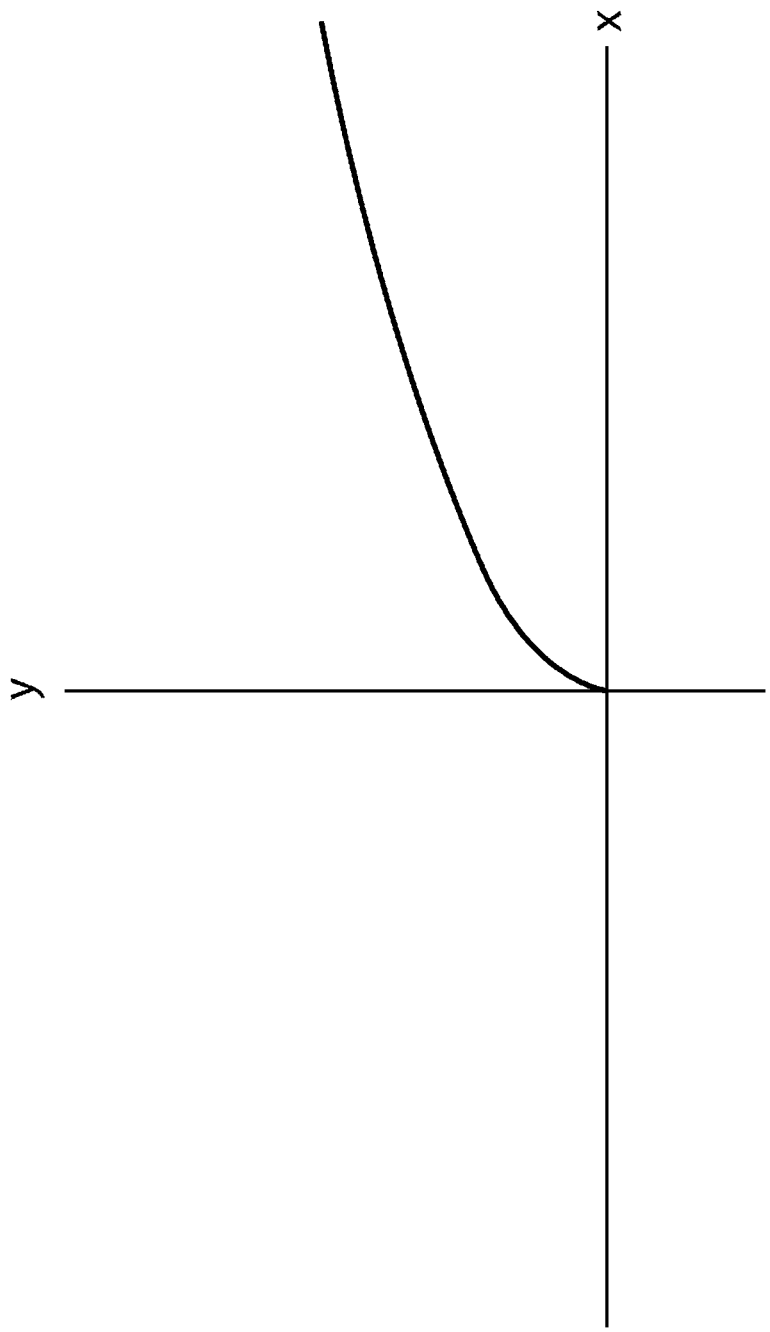
FIGS. 9 and 10 illustrate exemplary nonlinear functions representative of how a targeted display element may move on a display screen according to some example embodiments of the present invention.
Figure 10:
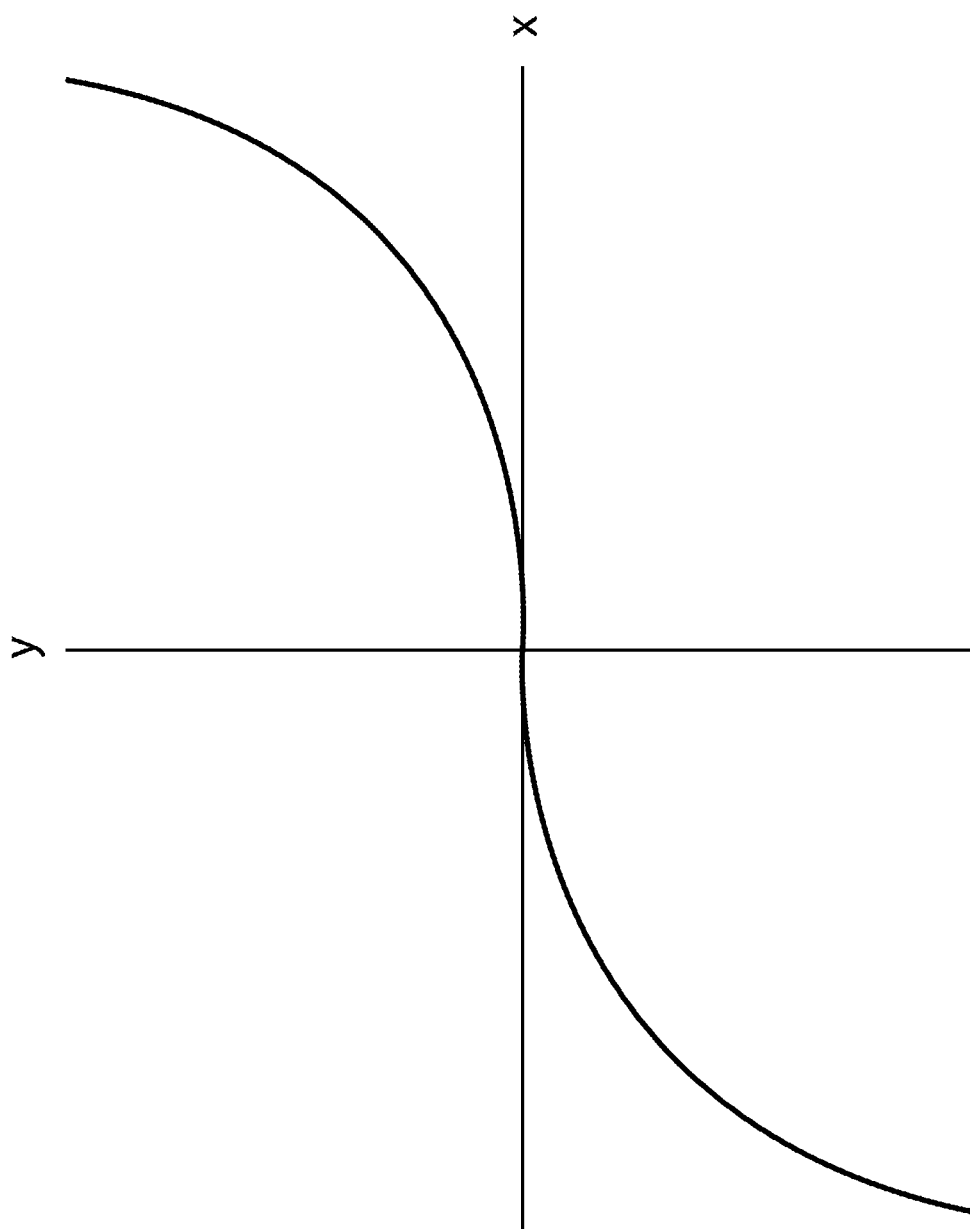

The selected element targeted for movement may also be accelerated linearly and/or nonlinearly depending on, for example, the configuration of the apparatus, the axis/axes in which the UI element is being moved, and/or based on any other reason. For example, there may be a plurality of acceleration functions that may be applied by the system. When a higher change of the speed is implemented, targeted UI element 32 can travel on the screen as desired, such as in a nonlinear, acceleratory-based function. FIG. 8 illustrates an exemplary linear function of x+1, while FIGS. 9 and 10 respectively illustrate exemplary nonlinear functions of $x^{0.5}$ and $x^3$ respectively. These functions may be applied to how a targeted UI element moves on the screen when boom is used. For example, the boom functionality may be a linear and/or nonlinear feature. If nonlinear, the longer a user touches a boom button, the faster the target object moves across the screen. In such instances, a time sensitive function can be implemented by using a timer that can be initiated, for example, once the clutch is engaged. An accurate hardware optimized timer can be created by: retrieving the time (e.g., in milliseconds) in which the "clutch" was pressed/engaged from the processor and store the value to a global variable in memory, and retrieve the current time and store to a local variable within an interval. Every time the interval is activated, the start time can be subtracted from the current time to get the total amount of time that has lapsed since the "clutch" has been engaged. Similar and/or the same functionality can be performed when boom is activated (with or without clutch engaged).

The movement function (e.g., linear versus acceleratory) may also or instead be dependent upon the touch area between the finger and the touch screen to associate the force applied to the boom UI element 34 with the acceleration of the selected UI element 32. For instance, a larger touch area between the finger and the touch screen resulting from a larger force applied to the boom UI element 34 may cause the processor to move the selected UI element 32 faster than when a smaller force (as measured by surface area of the finger causing the touch event) to the boom UI element 34. Once the element reaches its final location, the user may release boom UI element 34 at step S410, and the directional functionality may be removed from the selected element at step S412.

FIGS. 11-13 illustrate additional user interface displays that may be presented according to some embodiments of the present invention. To create a graphical user interface, a user may need to employ, control and/or otherwise manipulate multiple functionalities for a single user interface element among a plurality of user interface elements. Although only a single user interface element has been discussed thus far, when designing a webpage, video game, magazine layout, comic strip and/or any other type of graphical display, there may be multiple UI elements, such as UI element 32 and UI element 32B. However, only one of the UI elements may need to be manipulated. For example, the user may want to target UI element 32 for to be filled with color. Other example manipulations include making gradient colors, making a layer blurry or sharper in appearance, darkening or lightening a selected area, or moving a selected area or a selected layer around the display screen.

For example and as shown in FIG. 11, a user may desire to build a webpage using online design application 1102. Within a blank canvas, the user may create one or more UI elements. The user may then desire to fill UI element 32 with a color. The user may first select a color by touching in proximity to color option 1104 from a color palette displayed in an onscreen overlay. By selecting color option 1104 and then touching UI element 32, UI element 32 is identified as the targeted user interface element should clutch UI element 30 be engaged. Upon targeting the UI element 32, the element identifier of UI element 32 may be stored to memory as discussed above. The user can then select clutch UI element 30, thereby isolating and engaging UI element 32 for manipulation. Upon touching UI element 32 while clutch UI element 30 is engaged, the apparatus may cause UI element 32 to be colored with the color associated with option 1104. If the user then selects UI element 32B without disengaging clutch UI element 30, UI element 32B will remain as is and not be manipulated because the engagement of clutch UI element 30 can cause the manipulation functionality to be isolated to the targeted UI element, thereby avoiding unintended manipulations when building or otherwise designing a graphical display using a multi-touch display device.

A user may also desire to enlarge the selected, targeted UI element 32 after it has been colored gray such that it overlaps (and hides) UI element 32B, as shown in FIG. 12. As yet another example, as shown in FIG. 13 in which UI element 32B is not included, a user may use a finger to freely move UI element 32 around within the web design application 1102 without using boom UI element 34 while clutch UI element 30 is engaged. For example, the UI element 32 may track the movement of the user's finger while clutch UI element 30 is engaged and UI element 32 is targeted for manipulation. In some embodiments, as shown in FIG. 12, the precise pixel location of a targeted UI element may be provided. For example, x-coordinate 1106 and y-coordinate 1108 can be provided to enable a user to know a coordinate reference point when building a graphical user interface. X-coordinate 1106 and y-coordinate 1108 may also be useful when using boom to get a precise location of the targeted UI element, despite the difficulties sometimes associated with the precision tolerances of multi-touch display components.

Without clutch functionality to engage and disengage particular UI element(s), there is a risk that some or all of the UI elements will have event listeners assigning functions for specific touch event such as "touchmove," in which case the user may unintentionally move a UI element. Clutch provides a mechanism for individually assigning event listeners with functions to elements once the clutch has been engaged. Although some embodiments were discussed herein with the order in which the clutch being engaged matters, in other embodiments the clutch functionality can be configured on an apparatus such that the clutch functionality is agnostic to the order in which the element and clutch functions are engaged.

According to some embodiments of the present invention discussed herein, while the examples and displays shown above are directed to clutch UI element 30 and/or the other UI elements being included in the same display as that being used to build the graphical user interface, in some embodiments (not shown) one or more other user input components may be used, such as an external track pad functioning as the clutch activator (as opposed to or in addition to UI element 30). Likewise, one or more other features discussed herein may be implemented in any suitable manner without departing from the spirit of the invention. Further, as noted above, FIGS. 3 and 4 are flowcharts reflecting methods, systems and computer programs according to exemplary embodiments of the present invention. It will be understood that each block or step of the flowcharts, and combinations of blocks in the flowcharts, may be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the flowcharts. These computer program instructions may also be stored in a computer-readable memory that may direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, while many of the examples discussed above are largely related to using a multi-touch device to create content by manipulating visual, on-screen objects (e.g., design a webpage, build a video game, layout a presentation, etc.), similar functionality may be used for interacting with and/or otherwise consuming content using, for example, a multi-touch device. For example, video games may be played using clutch UI element 30 and/or boom UI element 34. For instance, in a first person shooter game, clutch UI element 30 can be used as a trigger button and boom UI element 34 as a character and/or field-of-view movement control. The timing functionality (e.g., how long a user touches a certain area of the screen), the pressure sensitivity functionality (e.g., how hard a user is pressing based on the screen's surface area being touched) and/or the acceleratory functionality (e.g., applying an acceleration based on how long and/or how hard a touch event occurs as discussed in connection with FIGS. 9 and 10) can also be applied to the video game environment. For example, the longer and/or harder a user touches the trigger button (e.g., clutch UI element 30), the faster the character's firearm will shoot. As another example, the clutch UI element 30 may function as a throttle in a racecar and/or other type of driving game, and the longer and/or harder the user touches clutch UI element 30, the faster the vehicle will accelerate, and boom UI element 34 can be used to steer the vehicle (e.g., aircraft, boat, automobile, motorcycle, etc.). As yet another example, clutch UI element 30 and boom UI element 34 can be used in civilization simulation games, puzzle games, and/or any other type of games to navigate among (e.g., using boom) and select for manipulation (e.g., using clutch) the plethora of selectable objects displayed. Further, due to the agnostic configuration of embodiments discussed herein, the clutch and boom functionality can enable a user to interact with web-based games using a native application (e.g., web browser, other type of software capable of viewing web-based content, among others). For example, the video games can be served over a network 16 by server 14, and workstation 12 can be configured to play the video game just with a multi-touch device and without downloading any game-specific software or using any additional user interface components (e.g., joystick, Bluetooth mouse, etc.).

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A method of manipulating user interface elements presented on a display screen, comprising:
    displaying a target user interface element on a touch-sensitive display screen;
    determining a selection touch event has occurred in proximity to the target user interface element while there is an absence of a different touch event proximate a different user interface element;
    activating by a processor, selection functionality that enables a user interface element to be selected while there is an absence of the different touch event;
    selecting the target user interface element for manipulation in response to determining the selection touch event has occurred;
    determining when the different touch event is occurring proximate the different user interface element and assigning at least one event listener to the selected element;
    when the different touch event is occurring, activating, by a processor, manipulating functionality of the event listener assigned to the target user interface element;
    determining when the different touch event ceases to occur; and
    deactivating the manipulating functionality associated with the target user interface.

2. The method of claim 1, wherein selecting the target user interface element for manipulation comprises storing, in memory, a target element identifier associated with the target element in response to determining the selection touch event has occurred.

3. The method of claim 2 further comprises, in response to determining the different touch event has begun occurring:
    retrieving the target element identifier from memory; and
    associating the target user interface element with the manipulating functionality.

4. The method of claim 1 further comprising, in response to determining the target user interface element has been selected for manipulation, displaying a visual indicator identifying the target user interface as selected.

5. The method of claim 1, wherein activating the manipulating functionality enables a user to manipulate the target user interface element in a manner that is permitted only when the different touch event is being detected.

6. The method of claim 1, wherein activating the manipulating functionality enables a user to manipulate the target user interface element in a manner that is restricted unless the different touch event is detected.

7. The method of claim 1, wherein activating the manipulating functionality enables boom functionality for precision movement of the target user interface element on the display screen and displaying x and y pixel positions associated with the position of the target user interface element.

8. The method of claim 1 further comprising displaying an overlay including a plurality of selectable virtual buttons associated with one or more manipulating functionalities that are activated while the different touch event is occurring.

9. An apparatus configured to manipulate user interface elements presented on a display screen, comprising:
    a touch-sensitive display screen configured to:
        display a target user interface element;
        detect a selection touch event;
        detect a different touch event; and
    a processor configured to:
        determine the selection touch event has occurred in proximity to the target user interface element while there is an absence of the different touch event proximate a different user interface element;
        activate selection functionality that enables a user interface element to be selected while there is an absence of the different touch event;
        select the target user interface element for manipulation in response to determining the selection touch event has occurred;
        determine when the different touch event is occurring proximate the different user interface element and assigning at least one event listener to the selected element;
        when the different touch event is occurring, activate manipulating functionality of the event listener the target user interface element;
        determine when the different touch event ceases to occur; and
        deactivate the manipulating functionality associated with the target user interface.

10. The apparatus of claim 9 further comprising memory configured to store a target element identifier associated with the target element in response to determining the selection touch event has occurred.

11. The apparatus of claim 10, wherein in response to determining the different touch event has begun occurring, the processor is further configured to:
    retrieve the target element identifier from memory; and
    associate the target user interface element with the manipulating functionality.

12. The apparatus of claim 9, wherein in response to determining the target user interface element has been selected for manipulation, the processor is further configured to cause the display of a visual indicator identifying the target user interface as selected.

13. The apparatus of claim 9, wherein the processor is further configured to enable a user to manipulate the target user interface element in a manner that is permitted only when the different touch event is being detected.

14. The apparatus of claim 9, wherein the processor is further configured to enable a user to manipulate the target user interface element in a manner that is restricted unless the different touch event is detected.

15. The apparatus of claim 9, wherein the processor is further configured to enable boom functionality.

16. The apparatus of claim 9, wherein the processor is further configured to facilitate the display of an overlay including a plurality of selectable virtual buttons associated with one or more manipulating functionalities that are activated while the different touch event is occurring.

17. A computer program product comprising at least one non-transitory computer-readable storage medium storing computer-executable program code portions, the computer-executable program code portions comprising program code instructions for:
    displaying a target user interface element on a touch-sensitive display screen;
    determining a selection touch event has occurred in proximity to the target user interface element while there is an absence of a different touch event proximate a different user interface element;

activating selection functionality that enables a user interface element to be selected while there is an absence of the different touch event;

selecting the target user interface element for manipulation in response to determining the selection touch event has occurred;

determining when the different touch event is occurring proximate the different user interface element and assigning at least one event listener to the selected element;

when the different touch event is occurring, activating, by a processor, manipulating functionality of the event listener assigned to the target user interface element;

determining when the different touch event ceases to occur; and deactivating the manipulating functionality associated with the target user interface.

18. The computer program product of claim 17, wherein the instructions for selecting the target user interface element for manipulation comprises instructions for storing, in memory, a target element identifier associated with the target element in response to determining the selection touch event has occurred.

19. The computer program product of claim 18 further comprises, in response to determining the different touch event has begun occurring, instructions for:

retrieving the target element identifier from memory; and associating the target user interface element with the manipulating functionality.

20. The computer program product of claim 17 further comprising, in response to determining the target user interface element has been selected for manipulation, instructions for displaying a visual indicator identifying the target user interface as selected.

21. The computer program product of claim 17, wherein instructions for activating the manipulating functionality enables a user to manipulate the target user interface element in a manner that is permitted only when the different touch event is being detected.

22. The computer program product of claim 17, wherein instructions for activating the manipulating functionality enables a user to manipulate the target user interface element in a manner that is restricted unless the different touch event is detected.

23. The computer program product of claim 17, wherein the instructions for activating the manipulating functionality enables boom functionality for precision movement of the target user interface element on the display screen.

24. The computer program product of claim 17 further comprising instructions for displaying an overlay including a plurality of selectable virtual buttons associated with one or more manipulating functionalities that are activated while the different touch event is occurring.

* * * * *